United States Patent
Aurongzeb et al.

(10) Patent No.: US 10,223,057 B2
(45) Date of Patent: Mar. 5, 2019

(54) INFORMATION HANDLING SYSTEM MANAGEMENT OF VIRTUAL INPUT DEVICE INTERACTIONS

(71) Applicant: Dell Products L.P., Round Rock, TX (US)

(72) Inventors: Deeder M. Aurongzeb, Austin, TX (US); Michiel Sebastiaan Emanuel Petrus Knoppert, Amsterdam (NL); Mark R. Ligameri, Santa Rosa, FL (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 15/461,601

(22) Filed: Mar. 17, 2017

(65) Prior Publication Data
US 2018/0267762 A1  Sep. 20, 2018

(51) Int. Cl.
| | | |
|---|---|---|
| G06F 3/044 | (2006.01) | |
| G06F 3/14 | (2006.01) | |
| G06F 3/0354 | (2013.01) | |
| G06F 3/16 | (2006.01) | |
| G06F 3/0482 | (2013.01) | |
| G06F 3/0488 | (2013.01) | |

(52) U.S. Cl.
CPC ........ *G06F 3/1423* (2013.01); *G06F 3/03547* (2013.01); *G06F 3/044* (2013.01); *G06F 3/0482* (2013.01); *G06F 3/04886* (2013.01); *G06F 3/167* (2013.01); *G06F 2203/04808* (2013.01)

(58) Field of Classification Search
None
See application file for complete search history.

(56) References Cited

U.S. PATENT DOCUMENTS

| | | |
|---|---|---|
| 2007/0247435 A1 | 10/2007 | Benko et al. |
| 2007/0257891 A1 | 11/2007 | Esenther et al. |
| 2011/0047459 A1* | 2/2011 | Van Der Westhuizen ................... G06F 1/1692 715/702 |
| 2014/0298271 A1 | 10/2014 | Jakubiak et al. |
| 2015/0220142 A1 | 8/2015 | Parkinson et al. |

OTHER PUBLICATIONS

U.S. Appl. No. 15/461,593, filed Mar. 17, 2017, entitled "Information Handling System Management of Virtual Input Device Interactions," by inventors Deeder M. Aurongzeb et al.

* cited by examiner

*Primary Examiner* — Nicholas J Lee
(74) *Attorney, Agent, or Firm* — Zagorin Cave LLP; Robert W. Holland

(57) ABSTRACT

An information handling system presents visual images at plural display devices and moves the visual images at the display devices responsive to touches made at one or more of the display devices with movement managed in a point mode or a touch mode as selected by one or more predetermined inputs. In the touch mode, the visual image moves as the touch moves. At detection of the predetermined input to select the point mode, the visual image moves a greater distance than the touch movement so that the end user is able to move the visual image between separate display devices.

10 Claims, 9 Drawing Sheets

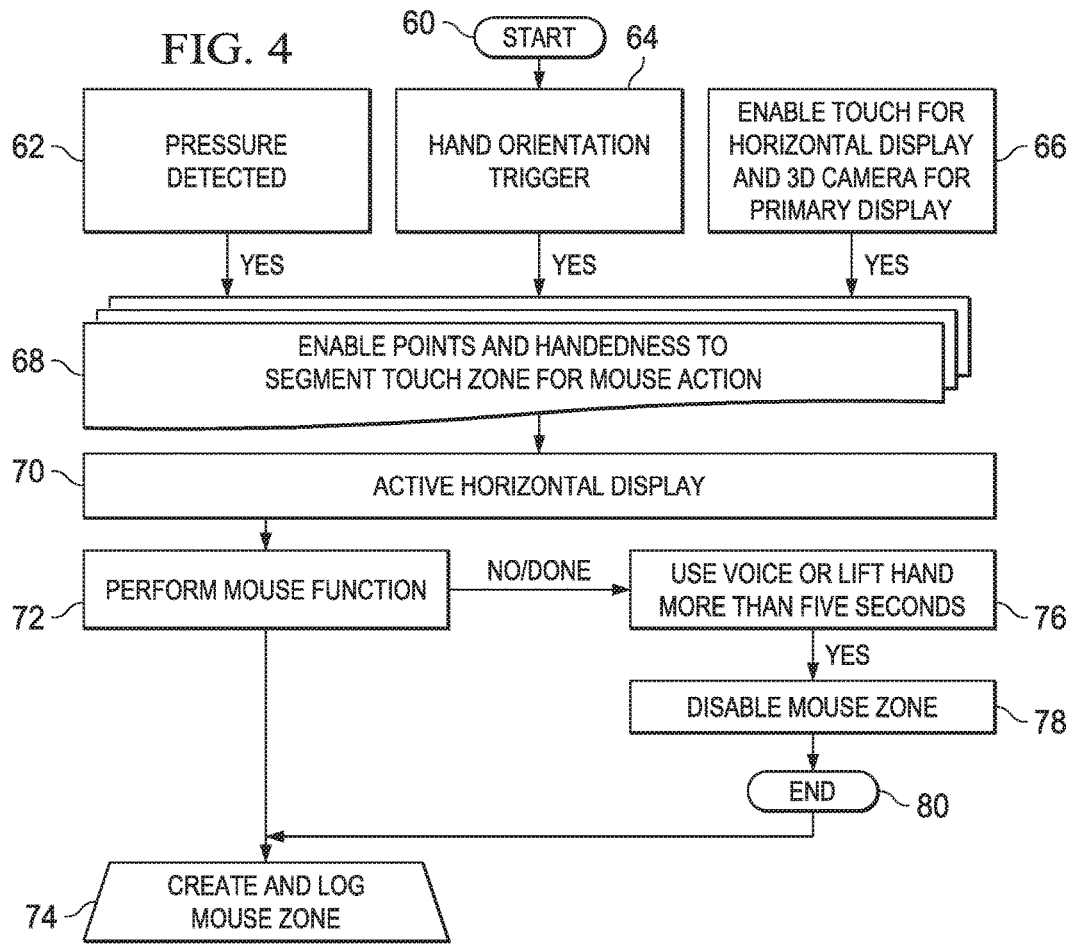
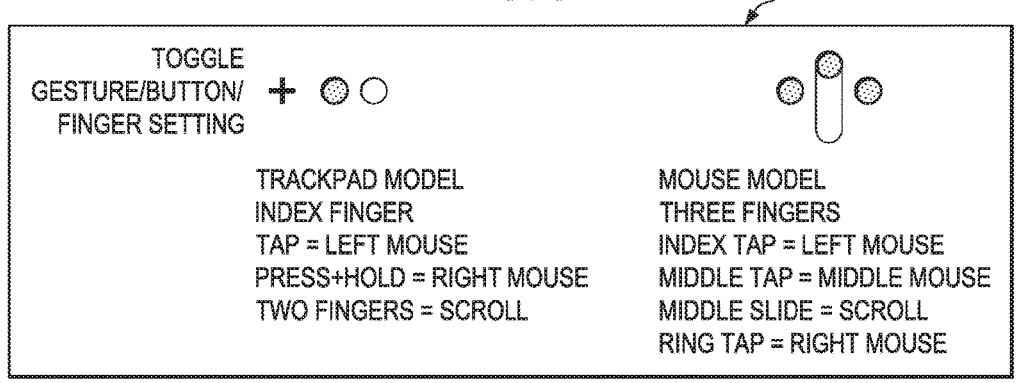

OBJECTS CAN BE DIRECTLY MANIPULATED WITH TOUCH ON SmartDesk. THE USER GRABS A DOCUMENT AND MOVES IT AROUND BY PLACING FOUR FINGERS OF THE LEFT HAND ON THE TOUCH SURFACE THE INTERACTION MODEL SWITCHES FROM DIRECT TOUCH TO VIRTUAL MOUSE. WITH THE RIGHT HAND INDEX FINGER THE USER IS STILL HOLDING THE DOCUMENT. THE DOCUMENT IS PASSED FROM THE FINGER TO THE CURSOR THE CURSOR IS DIRECTED WITH THE INDEX FINGER OF THE RIGHT HAND. THE CURSOR MOVES FASTER THAN THE HAND (ACCELERATION ETC. IS DEFINED IN MOUSE SETTINGS)

THE DOCUMENT CAN BE MOVED TO THE DESIRED LOCATION ANYWHERE ON THE TWO SCREENS

INFORMATION HANDLING SYSTEM MANAGEMENT OF VIRTUAL INPUT DEVICE INTERACTIONS

BACKGROUND OF THE INVENTION

Field of the Invention

The present invention relates in general to the field of information handling system input devices, and more particularly to an information handling system management of virtual input device interactions.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems accept end user inputs through a variety of different types of input devices. Traditionally, desktop or other stationary systems coupled through a cable to a keyboard and mouse through which an end user inputted keyed values and mouse clicks. Portable information handling systems, such as laptops having a clamshell configuration, typically integrate a keyboard and touchpad into a portable housing so that the end user can make keyed and touch inputs on the go. More recently, portable information handling systems have adopted a planar tablet configuration that does not integrate a keyboard, instead accepting keyed inputs and touch events through a touchscreen display. Virtual input devices presented on a tablet information handling system touchscreen provide a convenient user interface that does not increase system size, however, virtual devices do not generally provide the physical feedback of inputs that many users rely upon when performing inputs, such as the return of a key or click of a mouse. As a result, end user inputs made through virtual input devices tend to take more time and be more error prone. Often end users will interface peripheral input devices with tablet information handling systems if end users need to make large numbers of keyed inputs, such as by carrying a Bluetooth or other peripheral device along with the tablet information handling system.

In some use cases, tablet information handling systems offer end users a preferred input interface for making user inputs. As an example, a tablet information handling system form factor generally lays flat on a desktop surface to present information to an end user and accept end user touch inputs. A horizontally-disposed touchscreen offers a convenient surface to enter touch inputs that can include virtual input devices or a drawing surface, such as with a CAD application. In some instances, the horizontally-disposed touch surface is a portable information handling system, in others it is a display with a touchscreen or simply a touch input device without a display, such as a capacitive touch mat. The horizontal touch surface accepts direct end user touch inputs and also accepts inputs from tools resting on the surface, such as totems that aid end user interactions by providing a more intuitive interaction and feedback on inputs that are made. Where a horizontal touch surface includes a display, an end user is provided an additional visual tool to interact with, such as with a multi-display operating system configuration. For example, a tablet information handling system supports execution of applications when in a horizontal configuration and presents additional visual information at a vertical peripheral display.

One difficulty that arises from the use of a horizontally-disposed touchscreen display in a multi-display environment is that an end user generally must coordinate presentation of visual information on both displays using touch inputs at the horizontal display. As an example, if an end user wants to drag an application from one display to another with a mouse, the end user clicks on the window and drags the window to the other display. In contrast, when using a horizontal display to control presentations at a vertical display, the end user has to designate whether touch inputs are applied to one or both displays. Configuring control of touch inputs at the horizontal display disrupts workflow and calls for the end user to understand and interact with a control interface. Instead the end user may use a mouse or other device interchangeably with touch inputs at the horizontal display, such as by using a mouse to select a display device and touches to interact with the display device after selection. However, changing input devices also disrupts workflow and slows end user interactions and inputs with greater limb movements needed to manage display in user interface configurations.

SUMMARY OF THE INVENTION

Therefore, a need has arisen for a system and method which provides information handling system interactions with virtual input devices.

In accordance with the present invention, a system and method are provided which substantially reduce the disadvantages and problems associated with previous methods and systems for managing virtual input devices at an information handling system. An information handling system processes information with a processor and memory and presents the information as visual images at plural displays through a graphics processor. Virtual input devices automatically managed by the information handling system interact with visual images by transitioning between plural modes based upon predetermined conditions, such as the context determined at the information handling system.

More specifically, an information handling system processes information with a processor and memory to present visual images through a graphics processor at plural displays. At least one display includes a touchscreen that accepts end user inputs as touches made at the display and communicates the inputs to the information handling system through a touch controller. A mode selector interfaced with the touch controller automatically applies the touches as inputs based upon predetermined conditions, such as context-driven inputs related to predetermined conditions. For example, in one embodiment a seamless transition between inputs modes is provided with indications from an end user, such as additional touches, voice commands, or gestures captured by a camera. In a touch mode, an image touched by an end user moves as the end user touch moves. The end user transitions from the touch to a pointer mode with an indication, such as an additional touch at the touchscreen, so that the end user touch movements result in a greater relative movement of the visual image. The pointer mode provides movement of the visual image to another of the plural displays at a rate determined from the type of indication and context at the plural displays. Other types of multi-display interactions manage virtual devices to adjust visual images in a manner predicted to be intended by the end user. In one embodiment, a keyboard is presented at a vertical display to present keyed inputs made by an end user at a horizontal display. In various embodiments, other types of indications to manage virtual devices may adapt touch inputs detected at the touchscreen in various ways as content at the display changes and context of the information handling system usage model changes.

The present invention provides a number of important technical advantages. One example of an important technical advantage is that an information handling system provides more effective management of virtual input devices across plural displays. For example, an information handling system automatically evaluates touches at one display to apply the touches as multiple types of virtual devices. In one embodiment, visual images move in a touch mode or pointer mode based on one or more predetermined conditions, such as a configuration of touches at the first display. An end user has increased flexibility to move images between plural displays by selecting pointer mode without interrupting the end user's interface with the first display. In one embodiment, the hand providing motion to the visual image provides an additional touch to transition between touch and pointer motion of the visual image. The amount of motion imparted on a visual image in the pointer mode may also be adjusted by providing inputs at the touching hand or other types of inputs, such as from separate hand, a camera, or a voice command, etc. . . . In alternative embodiments, other types of touch inputs monitored by the information handling system drive interactions with virtual devices, such as by placing a keyboard on a second display that presents keyed inputs made at a first display.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 4 depicts a flow diagram of a process for selectively engaging a mouse function with touch inputs at a display;

FIG. 5 depicts an example embodiment for managing mouse input touches at an information handling system display;

DETAILED DESCRIPTION

Information handling system interactions with virtual devices are automatically managed to transition touch inputs seamlessly across plural displays. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
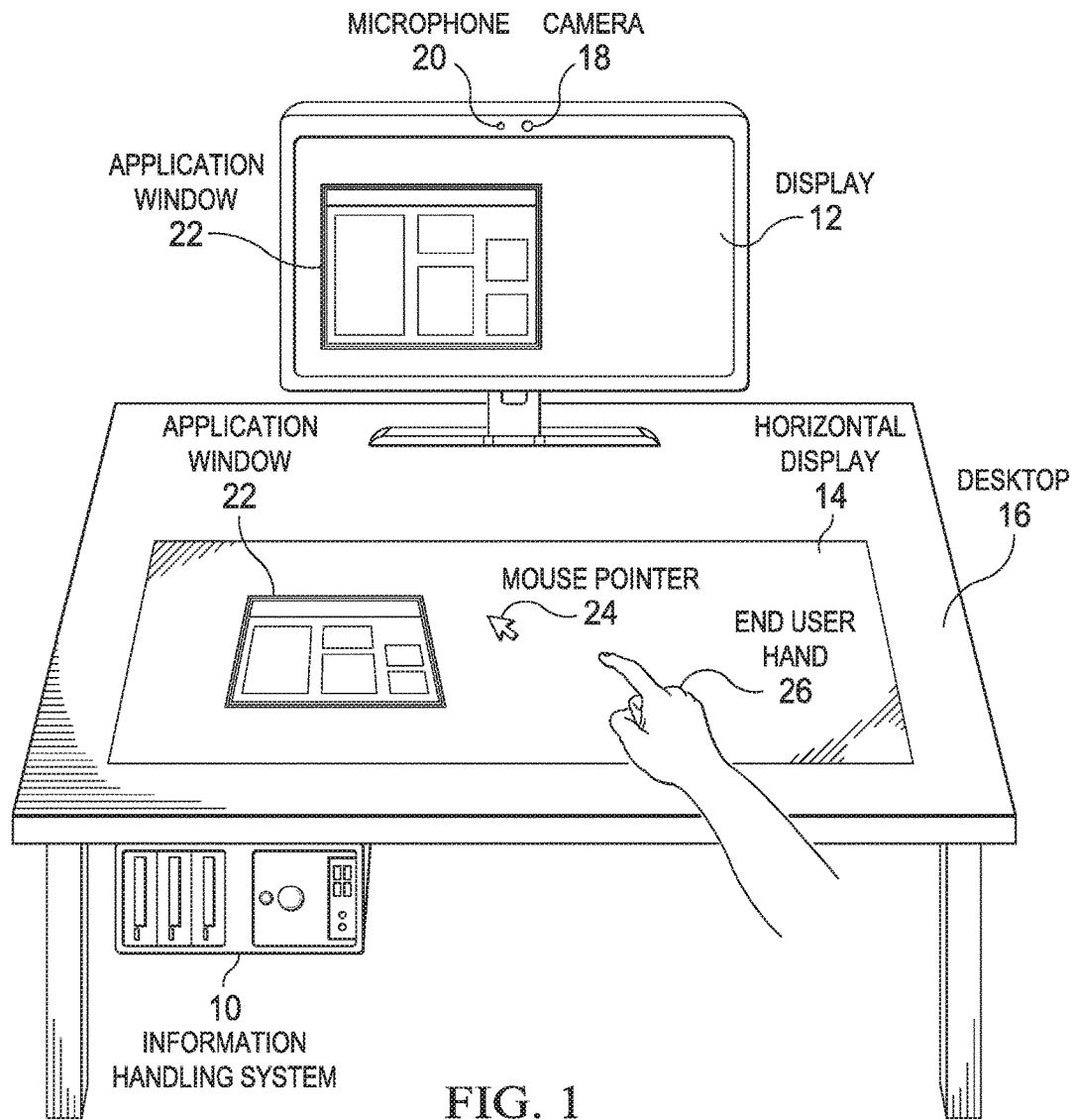
FIG. 1 depicts an information handling system managing virtual input devices to present information at a vertically-disposed display and a horizontally-disposed display.

Referring now to FIG. 1, an information handling system 10 manages virtual input devices to present information at a vertically-disposed display 12 and a horizontally-disposed display 14 resting on a desktop 16. In the example embodiment, vertical display 12 includes a camera 18 that captures images of desktop 16 and a microphone 20 to capture sounds. Information handling system 10 presents visual images at displays 12 and 14, such as application windows 22 and a mouse pointer 24. An end user hand 26 is depicted in a position to make a touch input at display 14 by touching the surface having a touch sensor, such as capacitive touch surface. Display 12 may also include a touchscreen surface to accept touch inputs. Other types of input devices may interaction with information handling system 10 to accept end user inputs, such as a physical keyboard and mouse interfaced with information handling system 10 through a cable or wireless interface.

In the example embodiment, an end user interacts with application windows 22 presented through either of display 12 or 14. End user hand 26 touches visual images on horizontal display 14 to move the visual images in a touch mode to desired locations on horizontal display 14. For example, by touching application window 22, end user hand 26 moves application window 22 by dragging it across horizontal display 14. In the touch mode, end user touches generally are limited to movement of the visual image within the display area of the display 14 on which the visual image is presented. Alternatively, end user touches manipulate mouse pointer 24 to perform end user inputs at application window 22. For example, touches at horizontal display 14 translate into movement of mouse pointer 24 in a pointer mode so that the effect of a touch and movement on horizontal display 14 translates to movement and inputs at mouse pointer 24 instead of at the point of the touch. In the pointer mode, end user touches translated to a visual image at a location distal the touches allows the visual image to move between displays 12 and 14.

Advantageously, by monitoring context at information handling system 10 and inputs at display 14, end user touches seamlessly transition between touch and pointer inputs to allow an end user free movement of visual images while maintaining a constant touch on horizontal display 14. For example, transitions between touch and pointer modes for a constant touch are commanded based upon active applications, the type of operation involved and other inputs detected by information handling system 10.

Figure 2:
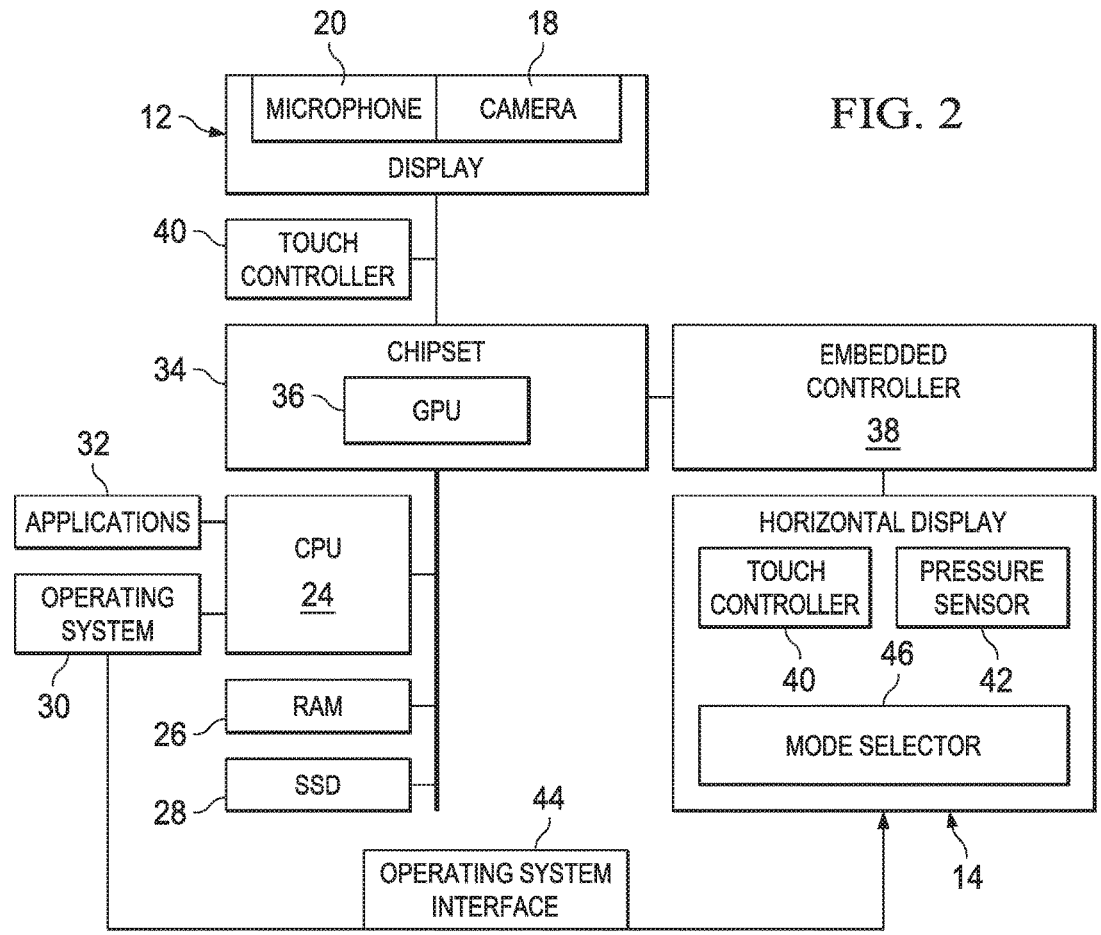
FIG. 2 depicts a block diagram of a system for managing virtual device inputs at plural displays.

Referring now to FIG. 2, a block diagram depicts a system for managing virtual device inputs at plural displays. An information handling system executes instructions on a central processing unit (CPU) 24 in cooperation with random access memory (RAM) 26. For example, CPU 24 boots an operating system 30 from persistent memory, such as a solid state drive (SSD) 28, and then executes applications 32 over operating system 30 to generate visual information for presentation at plural displays 12 and 14. For example, CPU 24 provides visual information to a graphics processing unit (GPU) 36 in a chipset 34 that in turn generates pixel values for communication to displays 12 and 14. In the example embodiment, an embedded controller 38 interfaces with a touch controller 40 of displays 12 and 14 to receive touch input locations and forward the touch inputs locations to operating system 30 executing on CPU 24. For example, an operating system interface 44 relates touches to content presented on the screen so that inputs are properly interpreted for the content that the end user interacts with. In various embodiments, the end user interacts directly with a visual image of an application 32 to input information, such as by writing or drawing with a pen or a finger, or the end user interacts with a virtual device that translates touches through an operating system interaction, such as virtual keyboard, mouse, color pallet or similar interactive device presented at the display.

End user touches at horizontal display 14 provide a convenient input resource since the presentation of visual images at horizontal display 14 offers a rich environment for the end user to engage with. A mode selector 46 executing as embedded code on touch controller 40 or other processing resources aids interpretation of touch inputs by operating system interface 44 to further enhance end user interactions. Mode selector 46 applies touches in a selected of plural modes based upon the context of the end user interactions and predetermined inputs made by the end user. Advantageously, context-based interpretation of touches allows an end user to adapt touches to desired inputs without lifting the touch from horizontal display 14. For example, when working with displayed application windows end users often move visual images to different locations on displays 12 and 14 to manipulate information and perform functions within applications. Conventional physical input devices, such as a keyboard and mouse, tend to require multiple arm and hand movements to effectively engage applications and information across different displays. Mode selector 46 simplifies interactions by automatically transitioning between touch, pointer, typing and other input modes with a continuous touch application. Mode selector 46 analyzes context at information handling system 10 including the applications executing on CPU 24, the applications presenting visual information at displays 12 and 14, the active application windows selected by the end user, the end user position, visual cues captured by camera 18, audible cues captured by microphone 20, hand and finger positions of an end user and historical inputs of an end user. In one embodiment, eye tracking by camera provides an indication of end user intent and is considered in the context applied to determine the selected mode. Mode selector 46 applies the analysis to select a touch input interpretation adapted to an end user's predicted input intent.

Figure 3:
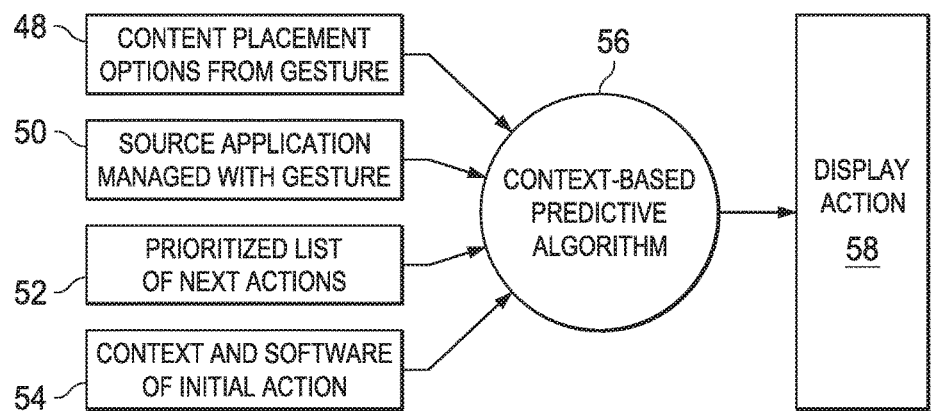
FIG. 3 depicts a flow diagram of factors considered in automated configuration of virtual device inputs at plural displays.

Referring now to FIG. 3, a flow diagram depicts factors considered in automated configuration of virtual device inputs at plural displays. A state machine, for example, monitors context and applies the detected context to predict end user intentions for touch inputs as display actions 58. In the example embodiment, monitored context includes at step 48 content placement options from a gesture. For example, if a gesture is detected, the possible interpretations of the gesture are considered along with the impact of each interpretation should that interpretation be applied. For instance, a tap at horizontal display 14 might indicate a enter command, a mode change command, a selection of a window or a variety of other interpretations, each of which is considered along with the impact on information presented by the information handling system if the interpretation is applied. At step 50, monitored inputs include source applications managed with the detected gesture. For example, when a gesture is detected, the available applications are compared with the gesture to determine if the gesture is relevant to the application. At step 52, a prioritized list of next actions is considered. The prioritized list is maintained and updated as the context of at the information handling system changes. For example, based upon available actions with open applications, a predicted list of likely end user inputs is generated and prioritized based upon the probability that the end user will make the input. For instance, a user with an active graphics application accepting drawing inputs and an idle presentation application preparing a presentation may have a greater likelihood of performing a cut and paste operation than opening another application window. In that context, the cut and paste operation will have a greater probability of implementation and will thus fall higher on the list of prioritize next actions. If in that context the user receives an email, the priority for an input to read the email may increase, thus changing the prioritized list of actions. Mode selector 46 observes inputs over time to learn end user preferences and adjusts the prioritized list of actions based upon historical end user interactions in different contexts. At step 54, the context and software of initial action are tracked as the end user makes inputs. At step 56, a context-based predictive algorithm monitors information handling system operations so that at step 58 appropriate display actions are performed.

Referring now to FIG. 4, a flow diagram depicts a process for selectively engaging a mouse function with touch inputs at a display. The process starts at step 66 and monitors pressure detected at step 62, hand orientation at step 64 and end user settings for enablement of touch and camera observation at the horizontal display. At step 68, if the pressure, hand orientation and settings indicate an end user selection of a mouse virtual device, then at step 70 the horizontal display is activated to accept virtual mouse inputs. At step 72, virtual mouse inputs are detected and forwarded to the operating system from the touch zone of the horizontal display that is activated for mouse inputs with mouse inputs created and logged at step 74. If the end user positioning indicates completion of mouse functions, the process continues to step 76 to end the mouse virtual device. For example, at step 76 a voice command or lift of the mouse hand for five seconds disables the mouse zone at step 78 and the process ends at step 80.

Referring now to FIG. 5, an example embodiment is depicted for managing mouse input touches at an information handling system display. The end user right hand touches with three fingers to support configuration as either a trackpad model or a mouse model. In the trackpad model, the index finger provides mouse touch inputs defined by the remaining finger touches. For example, a tap provides a left mouse button input, a press plus a hold provides a right mouse input and a two finger movement provides a scroll input. In the mouse model, three fingers define a mouse input. A tap with the index finger provides a left mouse input, a middle finger tap provides a middle mouse input, a slide with the middle finger provides a scroll input and a ring finger tap provides a right mouse input. In both the trackpad and mouse modes, movement of the hand provides movement of the mouse cursor at the display. As set forth above in FIG. 4, automated detection of the trackpad and mouse mode based upon context is provided based upon detection of the end user fingers in the appropriate configuration.

Figure 6:
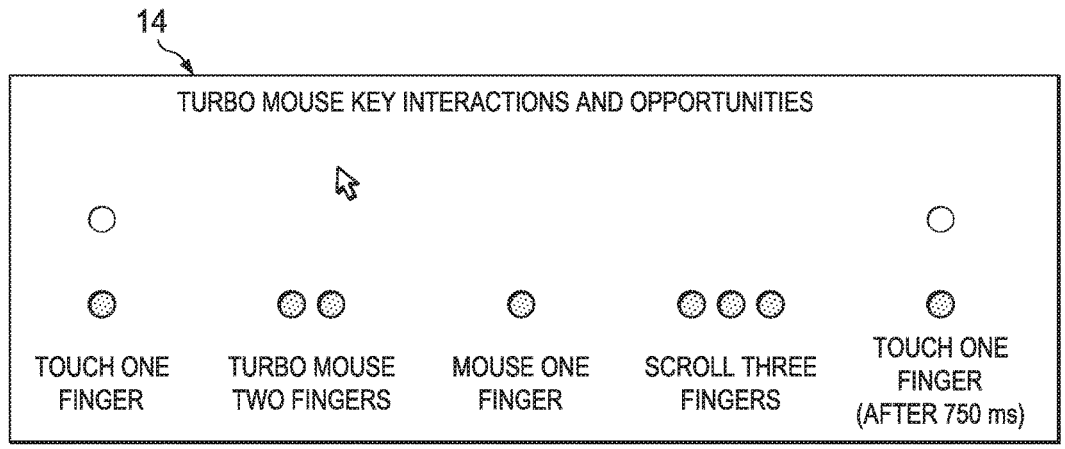
FIG. 6 depicts an example embodiment for managing the speed at which mouse inputs are implemented at the display.

Referring now to FIG. 6, an example embodiment depicts managing the speed at which mouse inputs are implemented at the display. Mode selector 46 analyzes context and end user touches to adapt mouse cursor movements to different touch speed movements so that an end user can change how rapidly an image presented on a display moves across the display in response mouse inputs. In a one touch finger mode, the touch associates with a visual image and moves the visual image at the same rate as the finger touch. The end user next presses two fingers while in the one touch mode to command transition from a touch mode to a pointer mode. In the pointer mode, the amount of movement applied to the visual image increases relative to the amount of movement made by the two fingers. For example, an end user touching an application window drags the application window with a touch so that the application window remains in the same relative position as the touch while the touch moves across the display. When the user touches a second finger of the same hand, the input is applied to transition from the touch mode to the pointer mode so that movement of the two fingers generates a greater relative movement of the visual image. Advantageously, an end user who is dragging a window on a horizontal display can move the window to the vertical display by placing a second finger to transition to pointer mode and using pointer mode to move the window to the other display. In such an instance, after the user moves the display, the touch inputs at the horizontal display will remain in the pointer mode. In a similar use case, the user may start in a pointer mode using the one finger mouse touch to move an application window from a vertical to a horizontal display at which a transition to touch mode may take place when the application window arrives at the user's touching finger. In such an embodiment, touches by the end user's other hand may be interpreted to transition between touch and pointer modes. For example, with an active window presented at a vertical display, a one finger touch at the horizontal display initiates pointer mode to move the window. Placing one, two or three fingers of the user's opposite hand on the horizontal display selects slow, medium or fast movement of the visual image in proportion to the movement of the mouse finger. Placing three fingers down with the mouse finger initiates a full mouse mode with clicking buttons and a scroll function. As shown to the far right, another indication of transition from touch to pointer modes is a place and hold of one finger for a predetermined amount of time, such as for 750 msec.

Figure 7:
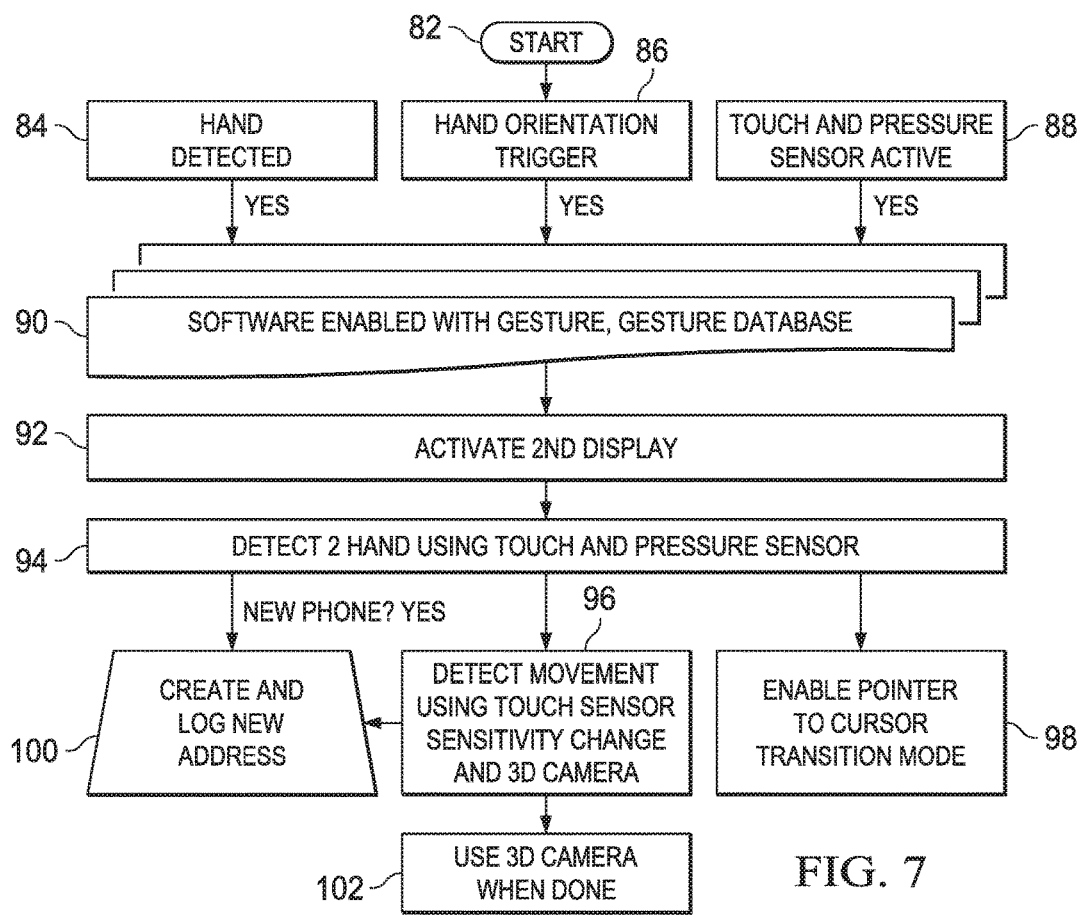
FIG. 7 depicts a flow diagram of a process for selectively engaging touch and pointer modes that move a visual image at a display.

Referring now to FIG. 7, a flow diagram depicts a process for selectively engaging touch and pointer modes that move a visual image at a display. The process starts at step 82 with analysis of system context that includes detection of a hand at step 84, a hand orientation trigger at step 86, and activation of touch and/or pressure sensors at step 88. At step 90 a determination is made of whether the active application has gesture inputs by virtual devices enabled for movement to a second display and at step 92 the second display is activated to prepare for presentation of the visual image. At step 94 touch is detected with two hands to indicate transition from a touch to a pointer mode. At step 96, movements are detected of the touch at the horizontal display and confirmed with a visual image captured of the desktop area. At step 100, the touch input movements are created and logged for application to the visual image. At step 102, a camera image is applied to track user inputs and indicate completion of the touch inputs. As pointer mode inputs are made, at step 98 transition from the pointer mode movement of the cursor to a touch mode movement of a visual object is initiated at detection of a lifting of a second hand from the horizontal display.

Figure 8:
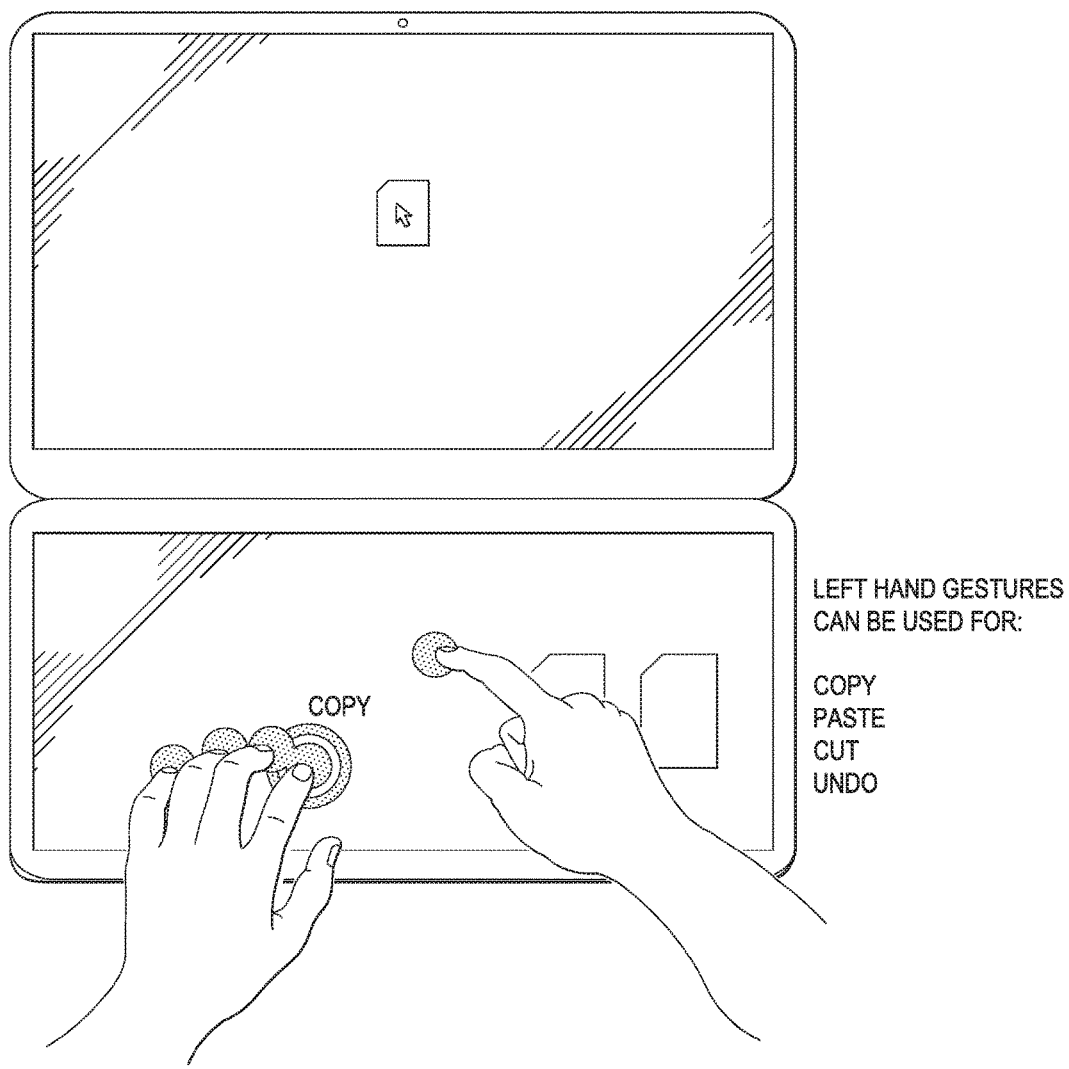
FIG. 8 depicts an example embodiment for managing touch and pointer mode functions using a series of interrelated touches.

Referring now to FIG. 8, an example embodiment depicts managing touch and pointer mode functions using a series of interrelated touches. In the example, two handed gestures manage a cut and paste of visual information from one application window to a second application window with transitions between touch and pointer modes. The end user indicate information of interest by touching the information with the right hand. A tap of the left hand first finger initiates a copy of the information. The end user may then move the information to a different application window by dropping and dragging the copied visual information to the desired location and releasing the right hand from touching the horizontal display. Alternatively, the end user may lift the finger of the right hand to transition from the touch mode to a pointer mode so that the visual information moves at a greater rate than in the touch mode. In the pointer mode, the end user moves the visual information to a different display located above the horizontal display. Different configurations of touches at the end user's left hand indicate different types of manipulation of the visual information, such as the rate of movement, cut, copy, paste and other operations.

Figure 9A:
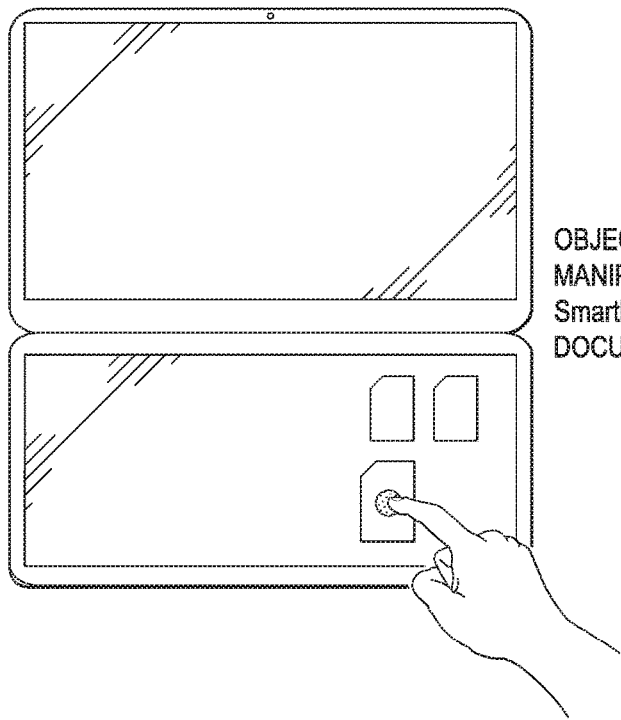
FIGS. 9A, 9B, 9C and 9D depict examples of virtual device interactions in touch and pointer modes managed by touch inputs at a display.
Figure 9B:
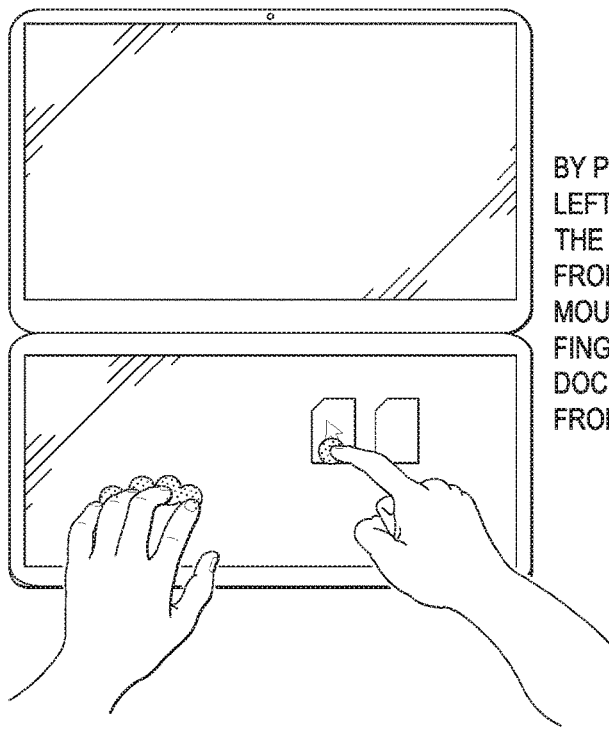
Figure 9C:
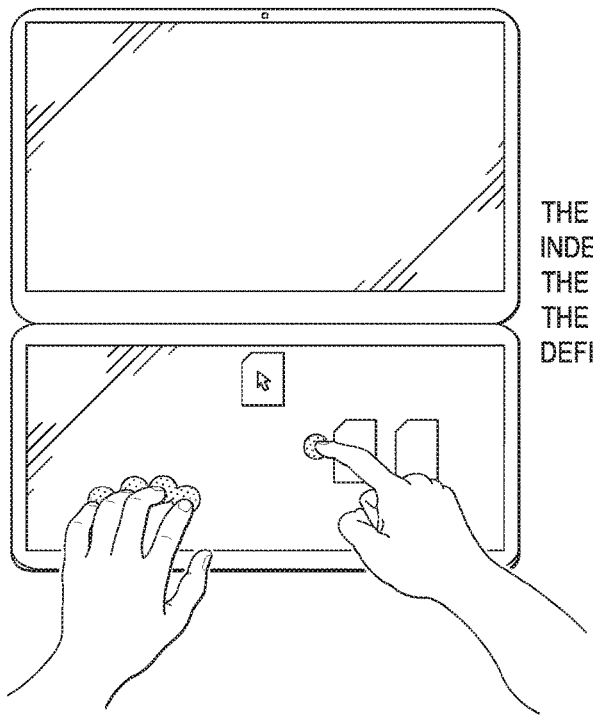
Figure 9D:
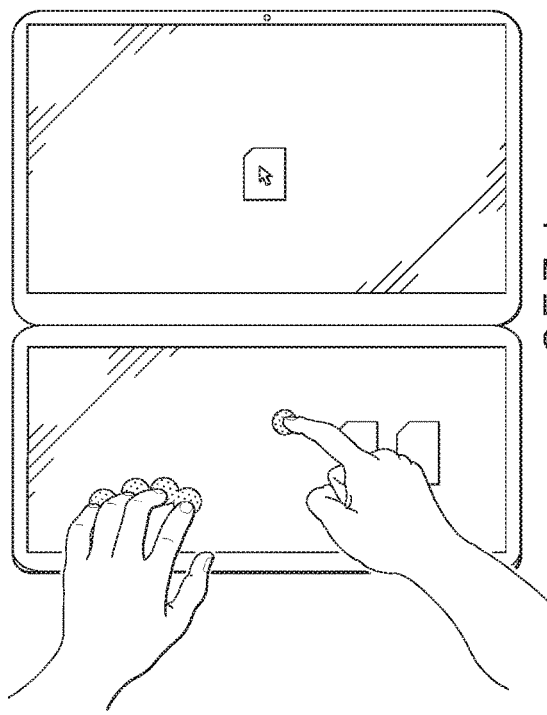

Referring now to FIGS. 9A, 9B, 9C and 9D depict examples of virtual device interactions in touch and pointer modes managed by touch inputs at a display. FIG. 9A depicts a touch mode where an object touched by a finger moves in correspondence with the finger as the finger moves on the display. FIG. 9B illustrates a transition to a pointer mode in which placement of the end user's left hand on the display generates a display of the cursor on the object so that the object moves with the cursor. As the end user moves the right hand finger and greater amount of movement is generated at the cursor and the visual image now associated with the cursor. FIG. 9C depicts how the amount of movement of the visual image increases based upon the number of fingers placed on the display with the left hand. FIG. 9D depicts that visual image moved to a separate display in the pointer mode. A similar operation in reverse may take place where a cursor moves the visual image from the distal display to the horizontal display and lifting of the fingers of the left hand provides a transition to touch mode by the end user of the visual image. Throughout the transitions between touch and pointer modes, the end user maintains a continuous touch with the left hand for a seamless transition of interaction with the visual image.

Figure 10:
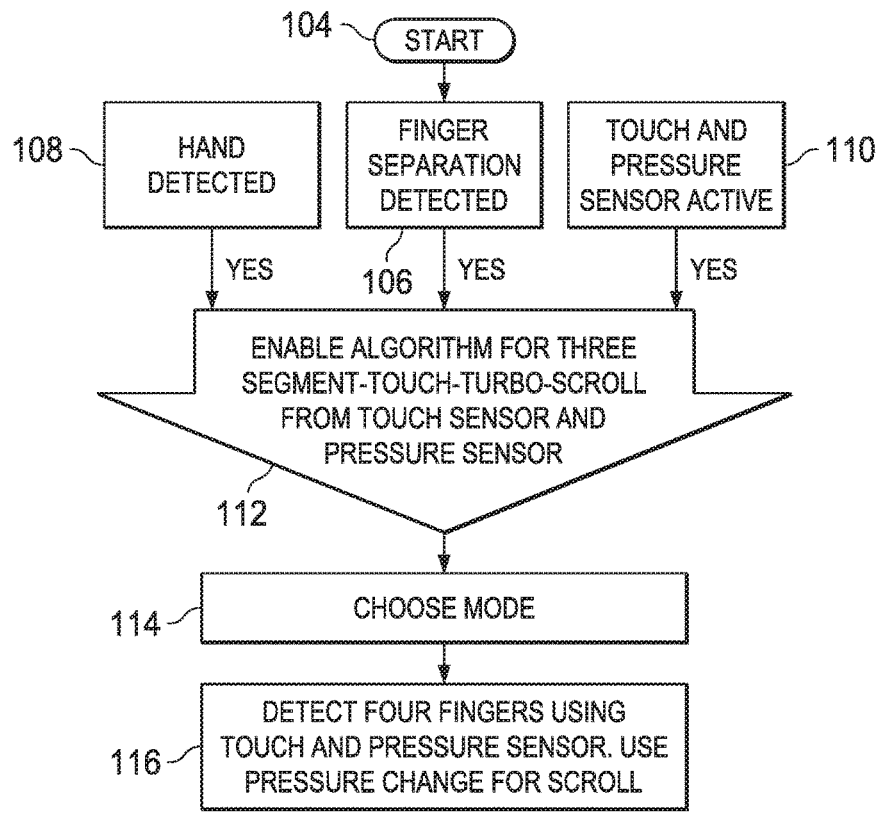
FIG. 10 depicts a flow diagram of a process for managing selection of touch mode interactions of a virtual device using a single hand.

Referring now to FIG. 10, a flow diagram depicts a process for managing selection of touch mode interactions of a virtual device using a single hand. The process starts at step 104 with detection of a hand at step 108, detection of finger separation at step 106 and activation of touch and/or pressure sensitivity at step 110. Based upon the context of end user interactions, the process continues to step 112 to enable three-segment-touch-turbo-scroll inputs from the touch and/or pressure sensor inputs. At step 114, the appropriate mode is selected based upon the end user touches and the context of the end user interactions. For example, if the end user is editing a document or browsing a web page, the cursor in the document transitions to a mouse pointer responsive to moves of the end user's fingers. In the mouse mode the end user interacts with content of the application to cut, paste and scroll through visual images. In alternative embodiments, context may place the cursor in a separate application window, such as the last application window that interacted with the mouse. Advantageously, the end user may quickly transition between typed inputs and mouse inputs with the same hand while maintaining his hand in the same position on the horizontal display.

Figure 11:
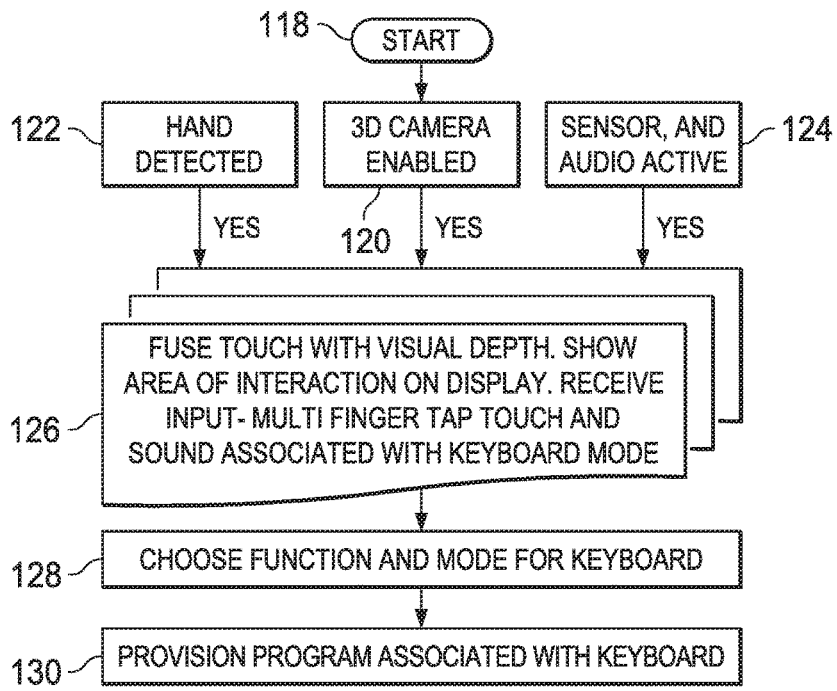
FIG. 11 depicts a flow diagram of a process for managing selection of touch mode interactions of a virtual device using non-touch sensors.

Referring now to FIG. 11, a flow diagram depicts a process for managing selection of touch mode interactions of a virtual device using non-touch sensors. The process starts at step 118 with hand detection at step 122, three-dimensional camera activation at step 120 and touch and audio sensors active at step 124. At step 126, touch, visual and audio inputs fuse with context at the displays to manage virtual device interpretation, such as with multi-finger touches and taps associated with a keyboard mode. At step 128, the virtual device function for interacting with touches is selected, such as might be associated with a keyboard input. At step 130, the application associated with the keyboard inputs is interfaced with the keyboard touch inputs. For example, as described below the application and inputs are placed at an upper portion of a vertical display and a keyboard is presented below the application window to depict keyed inputs as they are made.

Figure 12:
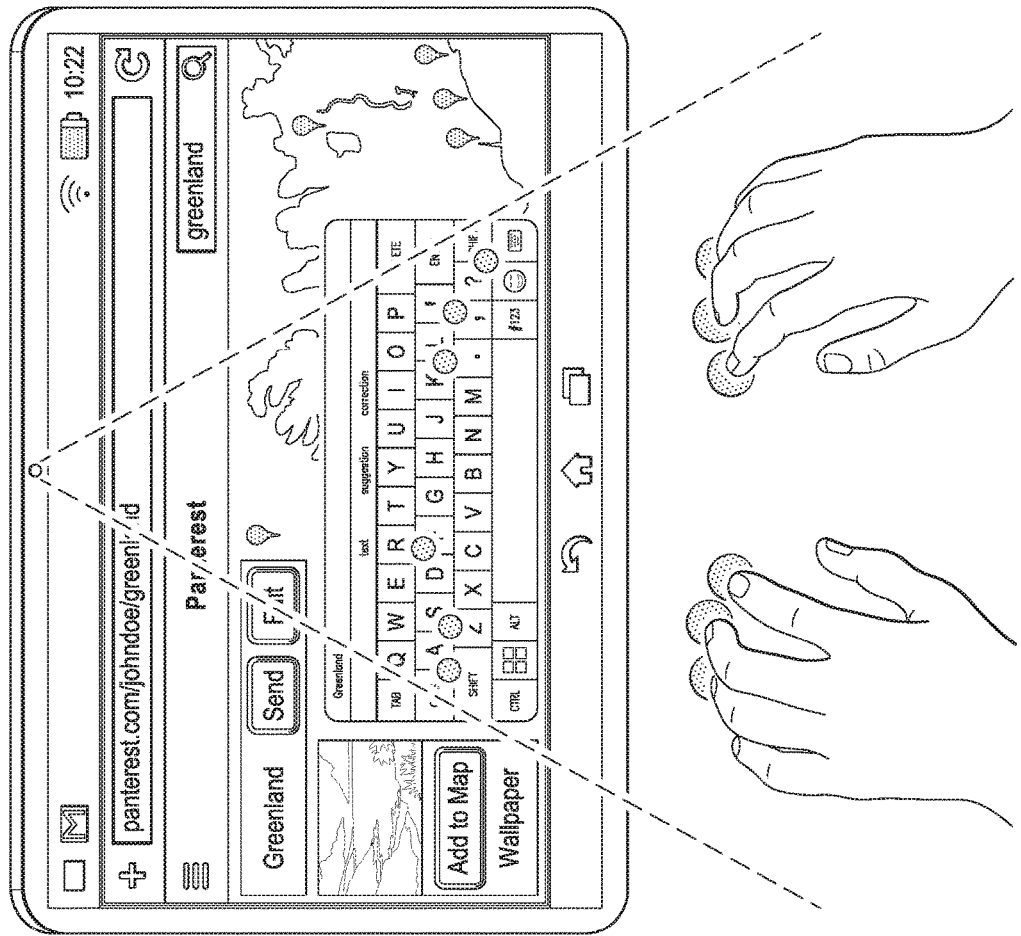
FIG. 12 depicts an example embodiment of typed inputs made at a horizontal display and presented at a vertical display.

Referring now to FIG. 12, an example embodiment depicts typed inputs made at a horizontal display and presented at a vertical display. As set forth in FIG. 11, end user hand positioned into a typing configuration at a horizontal display initiates activation of a keyboard virtual device on a vertical display. As keyed inputs are made at the horizontal display, the keyboard depicts the keyed inputs for the user to follow. Based upon the context of the presentation of the information handling system, the application selected for the keyed input is automatically presented above the keyboard. In one embodiment, the keyed inputs are presented at a portion of the vertical display while a window with the complete application remains open at the horizontal display. An end user seamlessly transitions between typed inputs, touch inputs and mouse inputs by altering finger touch configurations at the horizontal display so that rapid transitions between modes are done without significant arm motions by the end user.

Although the present invention has been described in detail, it should be understood that various changes, substitutions and alterations can be made hereto without departing from the spirit and scope of the invention as defined by the appended claims.

What is claimed is:

1. An information handling system comprising:
a processor operable to execute instructions to process information;
a memory interfaced with the processor, the memory operable to store the information;
a graphics processor interfaced with the processor and memory and operable to process the information to generate pixel values that present the information as visual images at a display;
a first display interfaced with the graphics processor, the first display operable to present the pixel values as visual images;
a second display interfaced with the graphics processor, the second display operable to present the pixel values as visual images and having a touchscreen operable to detect end user touches;
a touch controller interfaced with the touchscreen and receiving positions touched on the touchscreen by the end user touches; and
a mode selector interfaced with the touch controller, the mode selector monitoring context at the second display and operable to adapt touch inputs at the second display in response to a touch gesture, the adapted inputs selectively manipulating visual images presented at the first and second displays;
wherein the context comprises content presented at the first and second displays, applications executing on the processor and a prioritized list of next actions associated with the content presented at the first and second displays.

2. An information handling system comprising:
a processor operable to execute instructions to process information;
a memory interfaced with the processor, the memory operable to store the information;
a graphics processor interfaced with the processor and memory and operable to process the information to generate pixel values that present the information as visual images at a display;
a first display interfaced with the graphics processor, the first display operable to present the pixel values as visual images;
a second display interfaced with the graphics processor, the second display operable to present the pixel values as visual images and having a touchscreen operable to detect end user touches;
a touch controller interfaced with the touchscreen and receiving positions touched on the touchscreen by the end user touches; and
a mode selector interfaced with the touch controller, the mode selector monitoring context at the second display and operable to adapt touch inputs at the second display in response to a touch gesture, the adapted inputs selectively manipulating visual images presented at the first and second displays;
wherein mode selector adapts content on the first display to present a keyboard image, the keyboard image presenting keyed inputs made at the second display.

3. An information handling system comprising:
a processor operable to execute instructions to process information;

a memory interfaced with the processor, the memory operable to store the information;

a graphics processor interfaced with the processor and memory and operable to process the information to generate pixel values that present the information as visual images at a display;

a first display interfaced with the graphics processor, the first display operable to present the pixel values as visual images;

a second display interfaced with the graphics processor, the second display operable to present the pixel values as visual images and having a touchscreen operable to detect end user touches;

a touch controller interfaced with the touchscreen and receiving positions touched on the touchscreen by the end user touches; and a mode selector interfaced with the touch controller, the mode selector monitoring context at the second display and operable to adapt touch inputs at the second display in response to a touch gesture, the adapted inputs selectively manipulating visual images presented at the first and second displays;

wherein the context comprises a word processing application presented at the first display accepting keyed inputs at the second display, and the manipulating visual images comprise presenting a keyboard at the first display, the keyboard depicting key touches made at the second display.

4. A method for interacting with a graphical user interface presented at plural displays, the method comprising:

monitoring context associated with the plural displays;

detecting a touch at one of the plural displays;

adapting an action associated with the touch based at least in part upon the monitored context, the adapting selectively manipulating visual images presented at the plural displays;

wherein the monitoring context further comprises:

monitoring plural applications presenting visual information at the plural displays; and comparing touches at the one display with a prioritized list of actions associated with the plural applications.

5. The method of claim 4 wherein:

the context comprises a word processing application at a first of the plural displays;

the touch comprises fingers placed on a second of the plural displays in a typing configuration; and adapting an action comprises presenting a keyboard at the first of the plural displays.

6. The method of claim 5 further comprising presenting touches at the second of the plural displays as key inputs at the keyboard on the first of the plural displays.

7. The method of claim 4 wherein adapting an action further comprises selectively moving a visual image responsive to a motion of a touch in a pointer mode or a touch mode.

8. The method of claim 7 wherein moving the visual image further comprises moving the visual image in the pointer mode at a first or second rate based at least upon the context.

9. A system for interacting with visual images on plural displays, the system comprising:

a graphics processor operable to process the information to generate pixel values that present the information as visual images at a display;

a first display interfaced with the graphics processor, the first display operable to present the pixel values as visual images;

a second display interfaced with the graphics processor, the second display operable to present the pixel values as visual images and having a touchscreen operable to detect end user touches;

a touch controller interfaced with the touchscreen and receiving positions touched on the touchscreen by the end user touches; and a mode selector interfaced with the touch controller, the mode selector monitoring context at the first and second displays and operable to adapt touch inputs at the second display in response to a touch gesture, the adapted inputs selectively manipulating visual images presented at the first and second displays;

wherein the context comprises content presented at the first and second displays, applications executing on the processor and a prioritized list of next actions associated with the content presented at the first and second displays.

10. A system for interacting with visual images on plural displays, the system comprising:

a graphics processor operable to process the information to generate pixel values that present the information as visual images at a display;

a first display interfaced with the graphics processor, the first display operable to present the pixel values as visual images;

a second display interfaced with the graphics processor, the second display operable to present the pixel values as visual images and having a touchscreen operable to detect end user touches;

a touch controller interfaced with the touchscreen and receiving positions touched on the touchscreen by the end user touches; and a mode selector interfaced with the touch controller, the mode selector monitoring context at the first and second displays and operable to adapt touch inputs at the second display in response to a touch gesture, the adapted inputs selectively manipulating visual images presented at the first and second displays;

wherein mode selector adapts content on the first display to present a keyboard image, the keyboard image presenting keyed inputs made at the second display.

* * * * *